United States Patent

Lockard

[15] 3,706,874

[45] Dec. 19, 1972

[54] EMBOSSED CARD READER

[72] Inventor: Joseph Larue Lockard, Harrisburg, Pa.

[73] Assignee: AMP Incorporated, Harrisburg, Pa.

[22] Filed: May 18, 1971

[21] Appl. No.: 144,503

[52] U.S. Cl. ............................235/61.11 E, 250/227

[51] Int. Cl. ............................G02b 5/14, G06k 7/10

[58] Field of Search..235/61.11 E, 61.11 R, 61.11 C, 235/61.7 B; 250/227; 340/149 A; 194/4 R

[56] References Cited

UNITED STATES PATENTS

| | | | |
|---|---|---|---|
| 3,612,832 | 10/1971 | Goldstein et al. | 235/61.11 E |
| 3,463,890 | 8/1969 | Schinner et al. | 235/61.11 C |
| 3,611,292 | 10/1971 | Brown et al. | 235/61.11 E |
| 2,256,595 | 9/1941 | Metcalf | 250/227 |

*Primary Examiner*—Maynard R. Wilbur
*Assistant Examiner*—Thomas J. Sloyan
*Attorney*—William J. Keating, Ronald D. Grefe, Gerald K. Kita, Frederick W. Raring and Jay L. Seitchik

[57] ABSTRACT

The disclosure relates to a card reader for reading embossed indicia cards utilizing an optical scanner of the embossing which scans various parts of the indicia by means of reflection of light therefrom, reflection being dependent upon whether or not an embossment appears at that point. Fiber optic devices are utilized to conduct the optical scanning. The card is accurately located in the card carriage by means of a knife edge which abuts the extreme upward or downward row of indicia along the entire length thereof to accurately position the indicia relative to the read head. The card reader also includes an ejector device for ejecting the card after a reading has beem completed.

4 Claims, 11 Drawing Figures

EMBOSSED CARD READER

The invention relates to card readers having indicia thereon and more specifically to an optical card reader for use with indicia cards having embossed indicia thereon.

Embossed cards have been used in the prior art primarily for the purpose of allowing easy printing when placed in a card imprinting machine. However, the prior art has not been capable of reading the embossments on an indicia card easily and has therefor required very complex machinery to do same. Usually, the embossments were used mainly to provide clear imprinting of the indicia on an invoice for later reading, the indicia cards themselves not being read by the reader.

In accordance with the present invention, the problems of the prior art are overcome and there is provided a reader for embossed indicia cards capable of reading the characters directly from the embossments on the card. Briefly, the above is provided in accordance with the present invention in the following manner.

The card to be read is positioned in the machine in a manner that accurately locates the line of embossed account number numerals. A straight edge encounters the raised edges of the numerals on the card and with the force of card insertion, the carriage is depressed to a fixed stop, thus accurately positioning the card relative to the reading head. This is necessary because of the wide tolerances associated with the embossed cards.

The sensor of the read head consists of five discrete light sources and five discrete light sensors angularly and accurately positioned to scan five lines across the numerals. The sensor is pantographically spring loaded so that it rides directly on the top of the embossed characters. This is necessary to accommodate the wide range of heights encountered in embossed cards in use.

Upon command the properly located card is transported past the sensors. As the embossed characters pass the sensors, the reflected light from the background of the card is shut off from the sensors by the intimate contact of the sensor mount with the peaks of the raised characters. This produces a pattern of light and dark intervals to the sensor that can be used to identify the character. Card speed and character spacing tolerance is relatively unimportant because a clock is enabled by the spaces between characters. Pulses are counted between clock times and these pulse counts identify the character in known manner. After the card has been scanned, the carriage returns to the start position and the card is ejected by spring action indicating the end of a cycle.

It is therefore an object of this invention to provide a card reader for reading cards having embossed indicia thereon.

It is a further object of this invention to provide a fiber optic read head using the principle of reflection for reading indicia on an embossed indicia card.

It is a yet further object of this invention to provide a mechanical registration device for accurately positioning an embossed card in a card reader prior to reading.

It is a still further object of this invention to provide an automatic ejector device for ejecting the indicia card after a reading has been made thereon.

The above objects and still further objects of the invention will immediately become apparent to those skilled in the art after consideration of the following preferred embodiment thereof which is provided by way of example and not by way of limitation wherein:

FIG. 5 is a view taken along the lines 5—5 of FIG. 4;

FIG. 9 is three dimensional diagrammatic drawing illustrating the principles of operation of the read head in accordance with the present invention;

Figure 1:
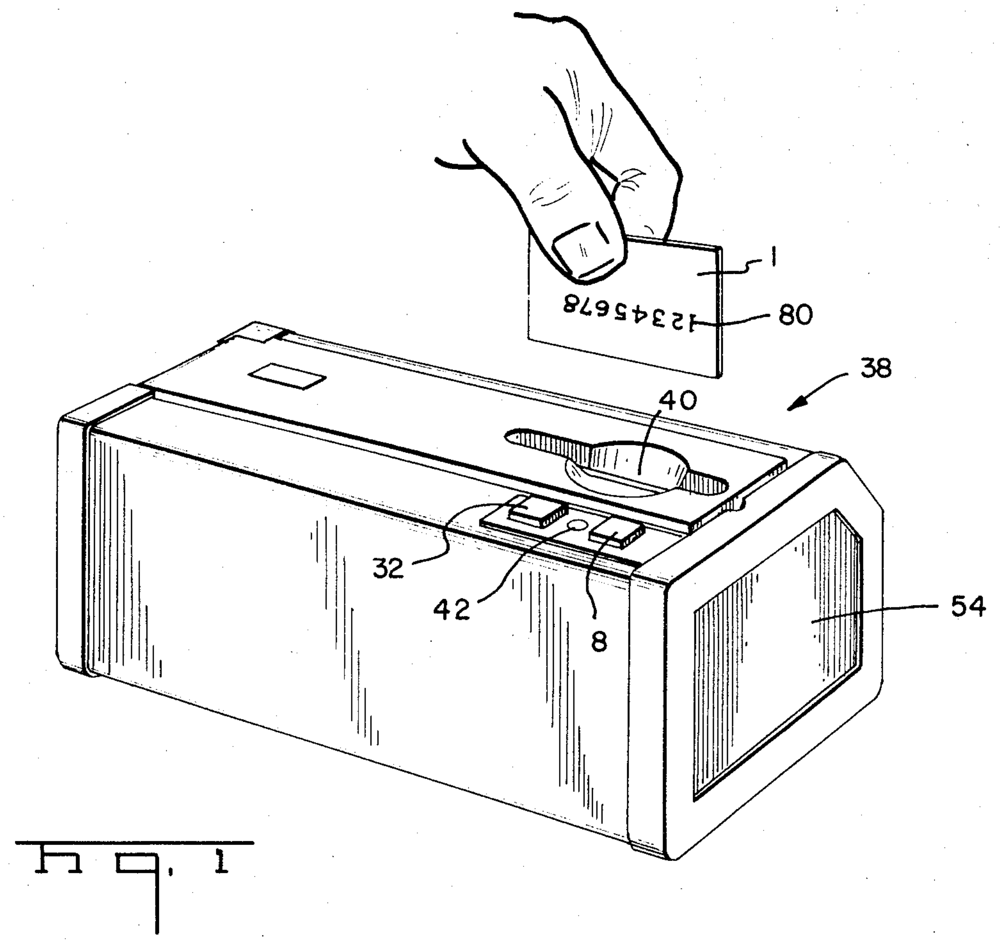
FIG. 1 is a three dimensional drawing showing the exterior of the card reader in accordance with the present invention.

Referring now to FIG. 1, there is shown the card reader 38 of the present invention having a card receiving slot 40 for receiving an embossed indicia card 1. The upper surface of the card reader 38 also includes a start button 8 for starting the reading operation and an eject button 32 for automatically ejecting the card from the reader. The reader also includes an operating light 42 which is lit when a card is within the card reader and being read. The card reader is operated by pushing an embossed card 1 into the slot 40 as far down as it will go, the card being depressed entirely within the housing until it is locket in place as will be described in more detail hereinbelow. At this point the start button 8 is depressed to commence the operating cycle.

Figure 2:
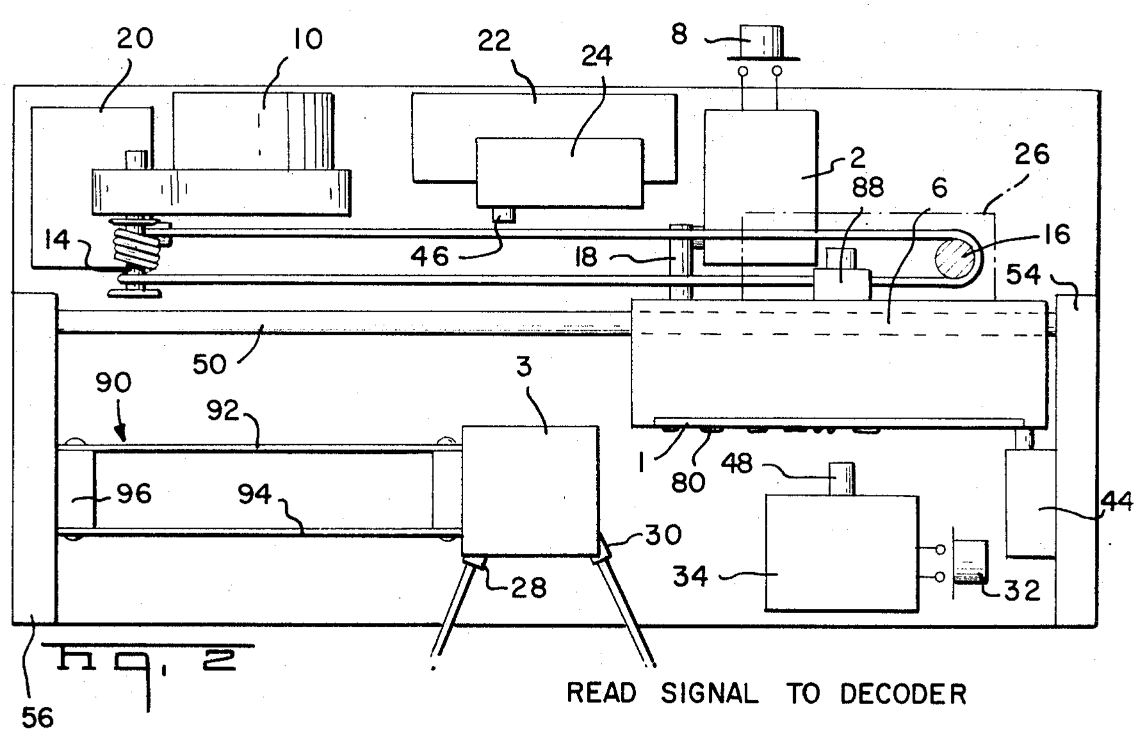
FIG. 2 is a diagrammatic top view of the preferred embodiment of the present invention showing the relative positions of the various components at the beginning of a reading cycle.
Figure 3:
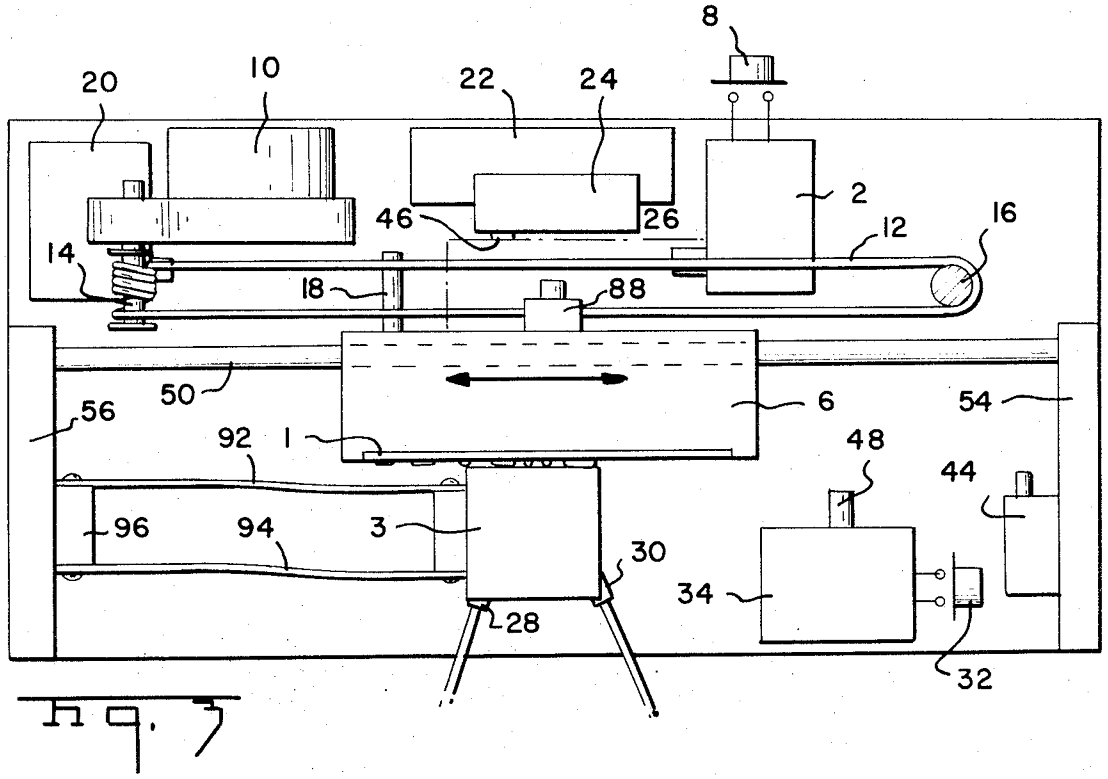
FIG. 3 is a view similar to FIG. 2 but showing the card part way through its path of travel and at the scanning station.

The operation of the system is begun by positioning the card within the card carrier as previously mentioned, and in the manner as will be described in more detail hereinbelow. The card 1 is positioned in the card carriage 6 as best shown in FIGS. 2 and 3. A normally closed switch 44 is held open by means of the card carriage latching mechanism (to be described in detail hereinbelow). When a card 1 is properly inserted, the switch 44 is closed by movement of the card latch mechanism (to be explained hereinbelow) to permit the reader to go through its cycle. The start switch 2, which is normally held open by the pin 18 on card carriage 6 is bridged by depression of the start button 8 to start the cycle and allow the drive motor 10 to be energized and rotate in one direction in order to pull the carriage 6 to the left by means of cable 12 and pulleys 14 and 16. In this manner, the card carriage 6 will move towards the left as shown in FIG. 3.

The card carriage 6 will move to the leftmost position as shown in FIGS. 2 and 3 and, at this point, operate return switch 20 which causes the motor 10 to reverse its direction and sets relay 22 to allow operation of the previously inhibited read light switch 24. As the carriage 6 moves back to the right due to reversal of the motor 10, the cam 26 mounted on the card carriage 6 trips the actuator 46 of the read light switch 24 and holds it in a depressed condition for the entire length of the cam 26 to keep the light 28 (FIGS. 4 and 9) on in the read head as will be described in more detail hereinbelow. It should be noted that the read light switch 24 is held on for a predetermined time length determined precisely by the length of the cam 26. The reading of the indicia on the embossed card takes place during the period that the read light switch 24 is in the on condition as will be described in detail hereinbelow. As the card carriage 6 again comes to rest in its rightmost position, pin 18 on the card carriage 6 contacts the actuator of start switch 2 and places it again in the open position. At this point the read cycle has finished but the card is still in the card carriage and being held within the housing of the reader 38. In this state the card 1 cannot be removed manually from the reader without further automatic operation. This operation consists in depressing the button 32 which energizes the ejector solenoid 34 by movement of the rod 48 thereof against the bottom surface of the latch mechanism as will be described in detail hereinbelow. This causes the card carriage which is normally biased in the upper position to move upwardly and allow the card 1 to exit through the slot 40 as shown in FIG. 1. The above generally describes the operation of the card reader in accordance with the present invention.

Figure 4:
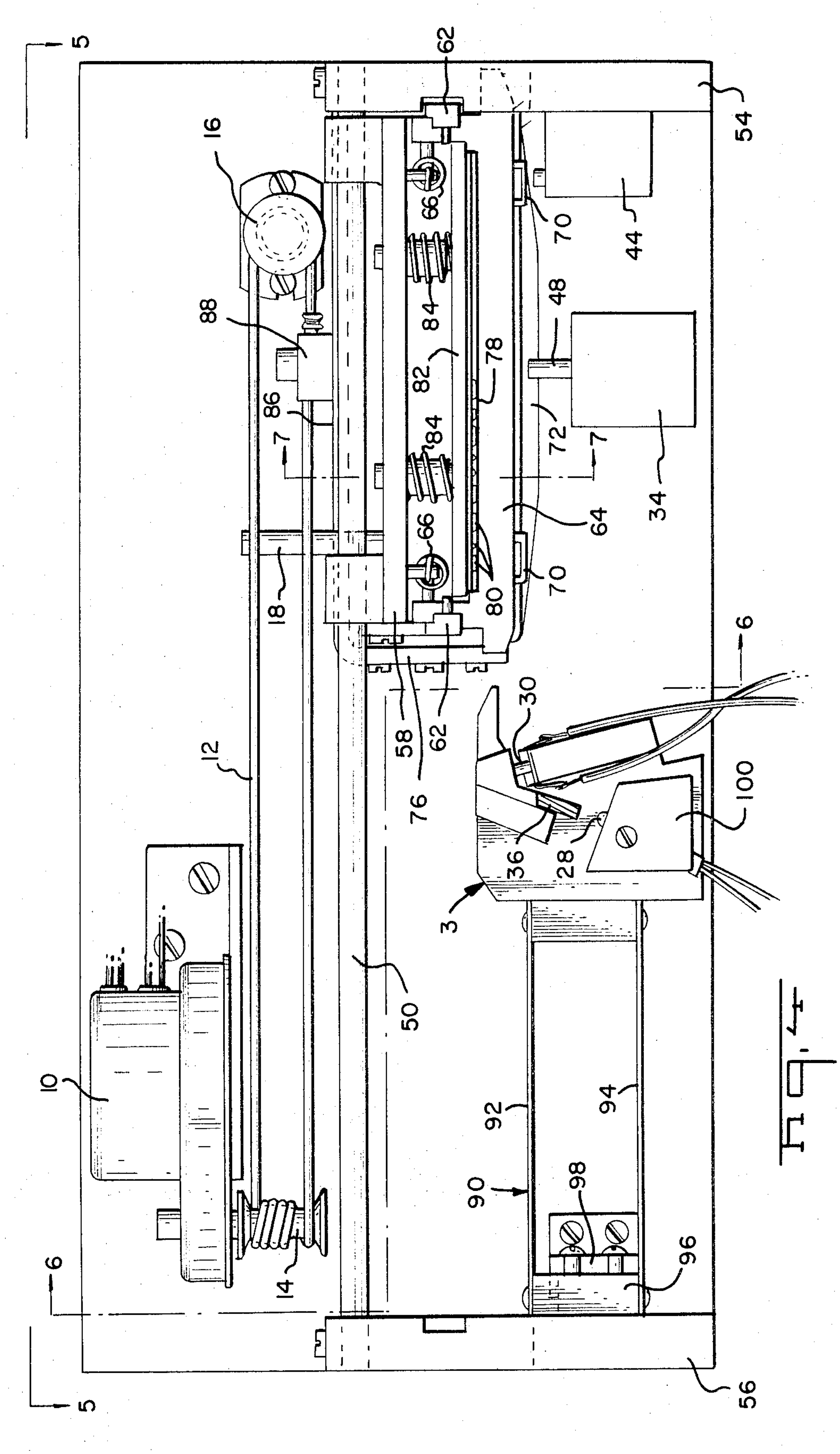
FIG. 4 is a top plan view of the device of FIG. 1 with the housing removed.
Figure 7:
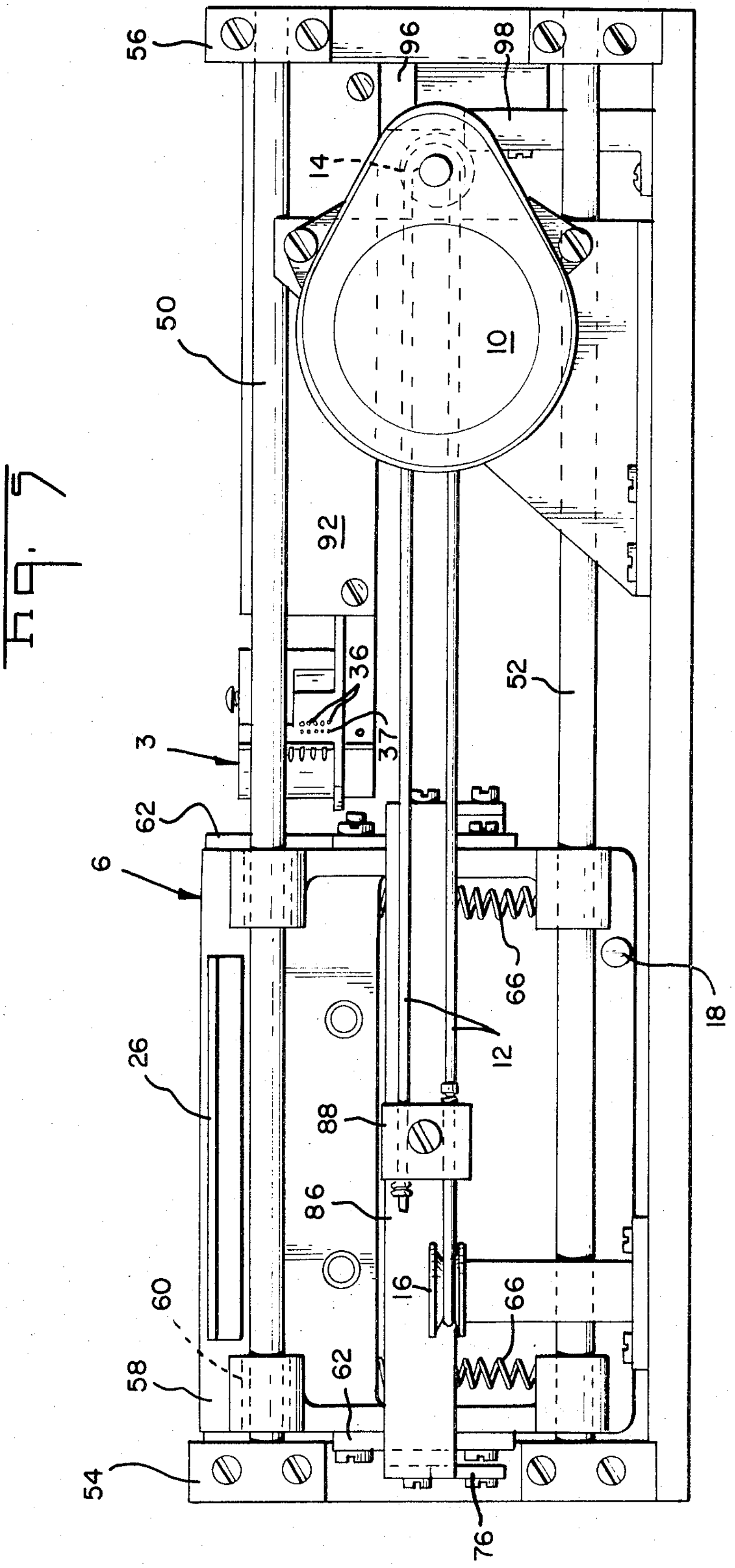
FIG. 7 is a view taken along the lines 7—7 of FIG. 4.
Figure 6:
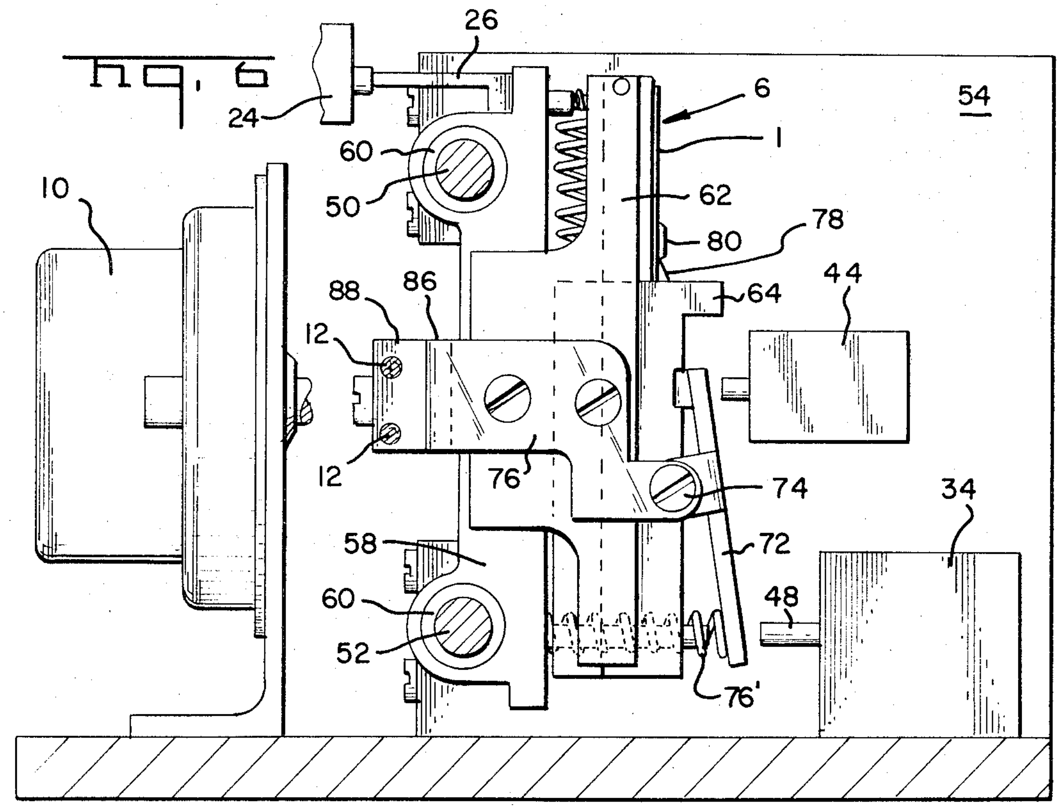
FIG. 6 is a section taken along the lines 6—6 of FIG. 4.
Figure 8:
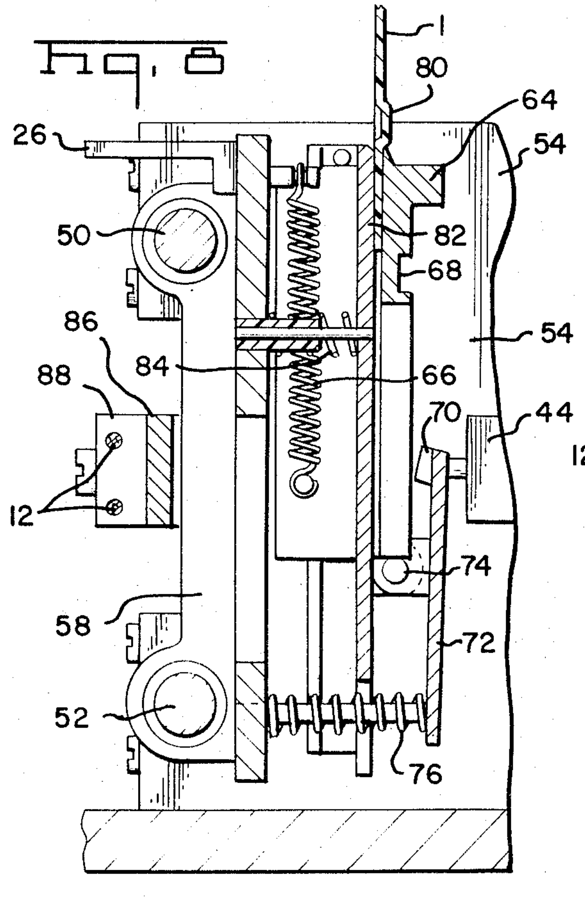
FIG. 8 is a view similar to FIG. 7 but with the carriage mechanism in its upward or relaxed position prior to the depression thereof.
Figure 7:
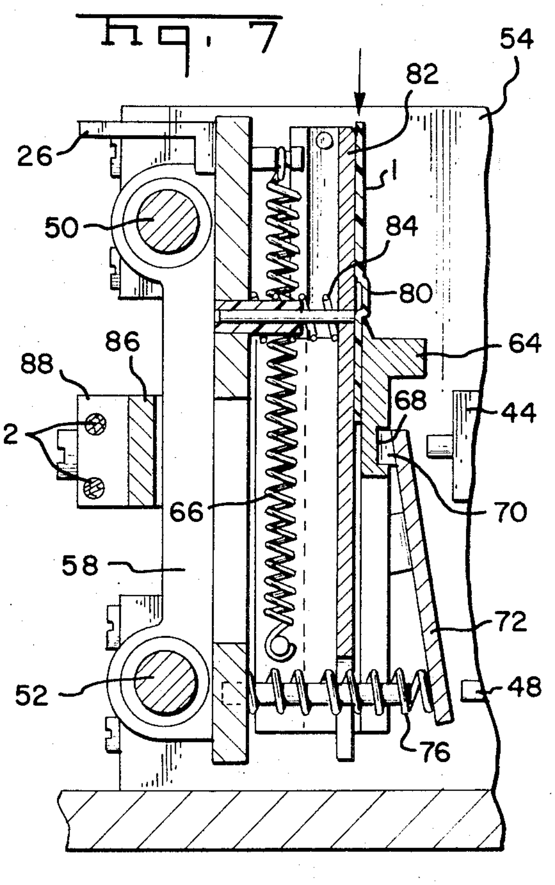
Figure 7:
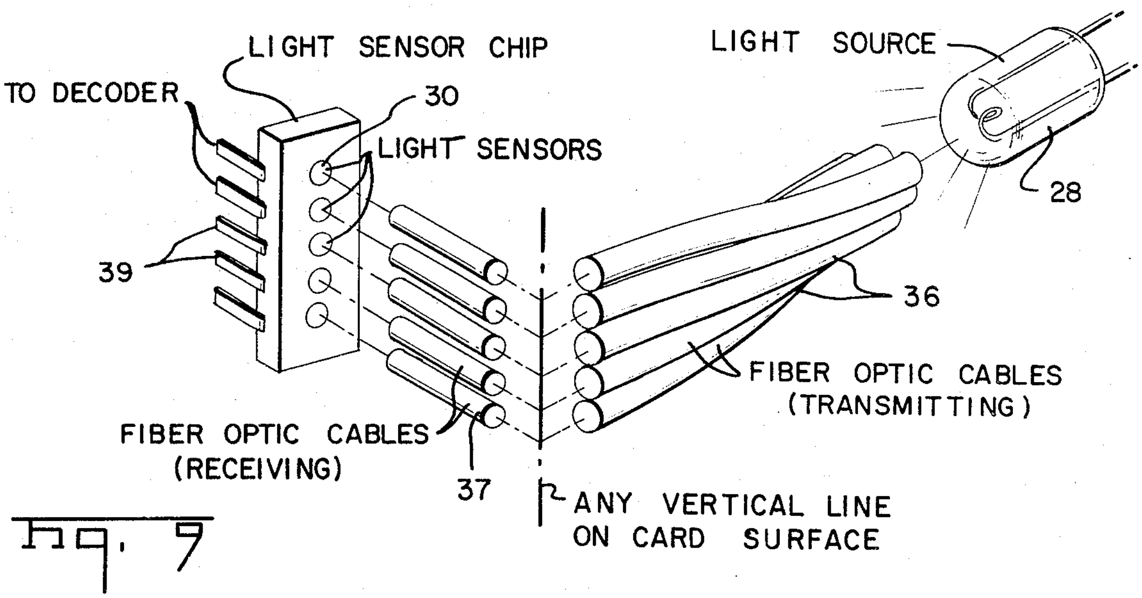

The card carriage 6 is fixed for horizontal travel along a pair of rods 50 and 52 which are journaled in side panels 54 and 56. The carriage comprises a back plate 58 with bearings 60 for easy travel along rods 50 and 52. A pair of guide blocks 62 is secured to the base plate 58, there being one such guide member on each side of the carriage 6. Block 64 moves vertically and is guided in its movement by the guide blocks 62 as best shown in FIG. 4. Block 64 is spring biased in its upward position (FIG. 8) by means of springs 66 which are secured to the base 58 at the top and to the block 64 at its bottom. Block 64 includes a latching groove 68 formed therein for mating with a detent 70 on the latching lever 72, the latching lever 72 being pivotally positioned at point 74 to a U-shaped bracket 76 mounted to the base 58. Latch lever 72 is spring biased by spring 76 in a counter clockwise direction, the spring 76 being held in compression. Latch lever 72 is designed to rotate in a counter clockwise direction when block 64 is in the lower position as shown in FIG. 7 so that the detent 70 will enter the groove 68 as shown in FIG. 7. This causes the block 64 to be locked in the lower position. It will be seen that when the block 64 is in the upper position, the switch 44 (FIG. 8) is held open by the lever 72. However, when the block 64 is placed in the lower position, as shown in FIG. 7, the counter clockwise movement of the lever 72 causes the switch 44 to close.

The block 64 has a knife edge 78 on its upward surface for accurately locating the card 1 in relation to the card carriage 6 and ultimately the read head 3. This is accomplished by means of the embossments 80 on the card 1 which contact the knife edge 78 upon insertion of the card 1 into the groove 40 of the card reader 38. It can be seen that downward manual movement of the card 1 into the groove 40 causes the embossments 80 to come into intimate contact with the knife edge 78 and further downward depression of the card 1 causes the block 64 to move downwardly from the position shown in FIG. 8 to the position shown in FIG. 7. This force applied to the card 1 to depress the carriage 64 causes the entire row of embossments 80 to line up with the knife edge 78, thereby accurately positioning the card 1 in the card carriage 6 as well as forcing the card carriage 6 to line up accurately relative to the read head due to the accurate positioning of the detent 70 in the groove 68 as explained above. It can therefore be seen that the downward insertion of the card 1 performs the functions of both accurately lining up the card relative to the card carriage and accurately lining up the carriage relative to the card reader, thereby eliminating any problem of registration.

The card carriage 6 also includes a back up plate 82 to hold the card in tight engagement against the block 64 and consequently against knife edge 78. The backing 82 is spring biased against the card 1 by means of a pair of springs 84 which operate between the back surface of the backing plate 82 and the inner surface of the base block 58.

The base 86 of the U block 76 carries a block 88 to which is fixed the cable 12 for horizontal movement of the carriage as previously described. Mounted to the back of base block 58 is a cam 26, previously described, which is of predetermined length for actuation of the read light switch 24 as previously described.

Referring now to FIG. 4, there is shown the read head 3 for reading the embossments on the indicia card 1 as will now be described. The read head 3 is mounted on a pantograph support 90 which comprises a pair of parallel arms 92 and 94 which are mounted on a block 96 which in turn is mounted on an adjustable bracket 98 to allow the arms 92 and 94 to be accurately positioned vertically to promptly position the read head relative to the path of travel of the card carriage and the card 1. The read head includes a light bulb 28 mounted therein in a holder 100, the lamp 28 being controlled by the read light switch 24 as previously described. Light transmission is effected by means of a plurality of fiber optic cables as best shown in FIG. 9, five such fiber optic cables 36 being shown therein. It should be understood however that the number of cables utilized is arbitrary and is determined by the degree of accuracy desired. It has been found that in the recognition of normal numbers, very accurate determinations can be made with five positions and even less. The fiber optic cables are bundled up at one end thereof which is adjacent the bulb 28. At the opposite end of the cables 36, the cables are positioned in a straight line perpendicular to the path of travel of the indicia on the card 1. The light transmitted from the bulb 28 through the cables 36 impinges against the card 1, reflections from the card being picked up by a set of fiber optic receiving cables 37 for transmission to a set of light sensors 30 which, individually, detect the light transmitted by each of the receiving fiber optic cables 37 to ultimately determine the character sensed. As shown in FIG. 9, a light sensor semi-conductor chip is shown with output leads 39 for transmission to the decoder for determination of the character sensed in well known manner.

Figures 10, 11:
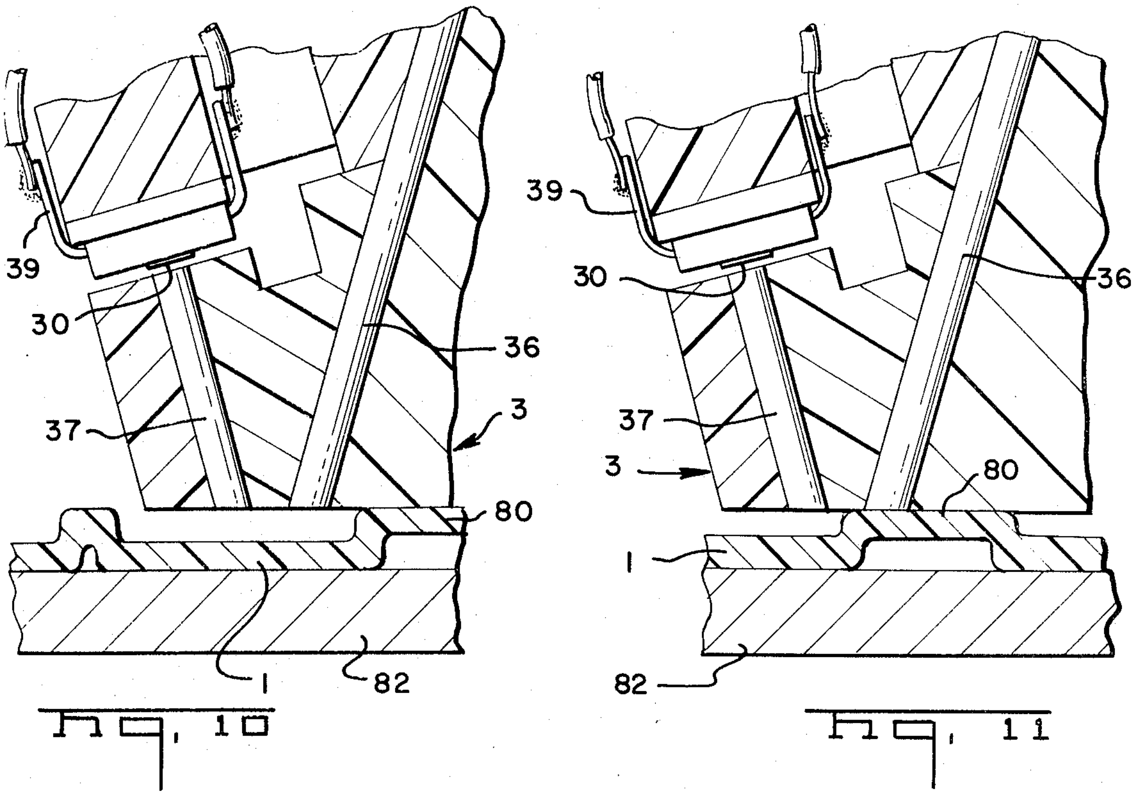
FIG. 10 is a fragmentary cross-sectional view of the read head in accordance with the present invention showing a reading being taken when no embossment is directly under the fiber optic devices.
FIG. 11 is a view similar to FIG. 10 with an embossment under the fiber optic devices of the read head.

Referring now more specifically to FIGS. 10 and 11, the read head of the present invention is shown in operation with an embossed indicia card 1 being passed therethrough. Referring first to FIG. 10, the read head is shown in operation when a card 1 is positioned thereunder with no embossment 80 positioned beneath the reader. It can be seen that light will be transmitted through the fiber optic transmitting cable 36 and be reflected from the card 1 to the fiber optic receiving cable 37 and then to the light sensors 30 and then to the decoder. With reference now to FIG. 11, it can be seen that when an embossment 80 is positioned beneath a fiber optic transmitting cable 36. The light passing therethrough cannot be reflected back to the fiber optic receiving cable 37 thereby providing the indication at the decoder for an embossment. In this way, in well known manner, a determination can be made of the character which has just passed under the reading head.

The pantograph arms 92 and 94 are flexible and biased somewhat into the path of travel of the card 1. The reason for this is to compensate for variations in the height of the embossments 80, thickness of card having already been compensated for by the spring loaded backing plate 82 as previously described. In this manner, the fiber optic transmitting cables 36 and fiber optic receiving cables 37 are always positioned flush with embossments 80 on the cards 1.

Though the invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. In a read head for reading embossed indicia which are transported serially past said read head and for supplying a code to a decoder, the improvement comprising: a block in said read head, a light source mounted in said block, a single group of light transmitting cables mounted in said block, the terminal ends of said single group of light transmitting cables being directed at a single line, said single group of light transmitting cables transmitting light from said light source to said single line, a second group of light transmitting cables mounted in said block, the terminal ends of said second group of light transmitting cables being located generally adjacent to and being directed at said single line, said first group of cables having their respective terminal ends selectively and intermittently covered by the embossed indicia serially transported past said read head to provide a code of intermittent optical signals incident upon said single line, said second group of cables receiving said code of intermittent optical signals and transmitting said code to said decoding means.

2. The structure as recited in claim 1, wherein, said terminal ends of said single group of light transmitting cables are generally coplanar and selectively and directly engagable by said indicia serially transported past said read head to provide intermittent shuttering by direct contact with the terminal ends of said single group of light transmitting cables, thereby producing said code of intermittent optical signals.

3. The structure as recited in claim 1, wherein, said single group of light transmitting cables is entirely composed of five optical transmission paths having their terminal ends in lineal, generally coplanar alignment.

4. In a card reader for reading a card provided thereon with embossed indicia, the reader including a read head, a decoder and a transport mechanism, the improvement comprising: card receiving means on said transport mechanism, an edge on said card receiving means for engaging a plurality of embossed indicia provided on said card and for aligning said plurality of indicia in desired serial alignment, said card receiving means being slidably displaceably mounted on said transport mechanism for positioning said serially aligned indicia of said card in a desired location internally of said card reader, a latching mechanism on said transport mechanism for latching engagement on said card receiving means and for retaining said card receiving means in desirable position on said transport mechanism, driving means internally of said card reader and operatively coupled to said latching mechanism, said driving means being operatively activated upon latching engagement of said latching means with said card receiving means for displacing said card receiving means serially past said read head, said read head being substantially fixedly mounted interiorly of said card reader, said latching means and said edge cooperating to position the embossed indicia of said card internally of said card reader and to align said indicia for serial displacement together with said card receiving means past said read head, said read head serially reading said indicia and supplying a coded input to said decoder.

* * * * *